United States Patent
Taghizadeh

(10) Patent No.: US 7,508,559 B2
(45) Date of Patent: Mar. 24, 2009

(54) SYNTHETIC COLOUR HOLOGRAM

(75) Inventor: Mohammad Reza Taghizadeh, Scotland (GB)

(73) Assignee: Heriot-Watt University, Edinburgh, Scotland (GB)

( * ) Notice: Subject to any disclaimer, the term of this patent is extended or adjusted under 35 U.S.C. 154(b) by 0 days.

(21) Appl. No.: 10/515,990

(22) PCT Filed: May 23, 2003

(86) PCT No.: PCT/GB03/02261

§ 371 (c)(1),
(2), (4) Date: Nov. 23, 2004

(87) PCT Pub. No.: WO03/100531

PCT Pub. Date: Dec. 4, 2003

(65) Prior Publication Data

US 2005/0219668 A1   Oct. 6, 2005

(30) Foreign Application Priority Data

May 24, 2002   (GB) .................................. 0212011.1

(51) Int. Cl.
*G03H 1/00* (2006.01)

(52) U.S. Cl. ................................ 359/2; 359/15; 359/32

(58) Field of Classification Search ..................... 359/2, 359/567; 430/10; 283/86
See application file for complete search history.

(56) References Cited

U.S. PATENT DOCUMENTS

| 3,957,354 | A |   | 5/1976 | Knop |
| 4,155,627 | A |   | 5/1979 | Gale et al. |
| 5,319,476 | A | * | 6/1994 | Yamazaki et al. ............... 359/2 |
| 5,483,363 | A | * | 1/1996 | Holmes et al. .................. 359/2 |
| 6,017,657 | A | * | 1/2000 | Mentz et al. .................... 430/1 |
| 6,252,685 | B1 |   | 6/2001 | Yokochi |
| 2006/0082850 | A1 | * | 4/2006 | Weaver et al. .................. 359/2 |

OTHER PUBLICATIONS

Barton et al., Dual-wavelength operation diffractive phase elements for pattern formation, Optical Society of America, Jul. 1997, vol. 1, No. 2.

* cited by examiner

*Primary Examiner*—Arnel C Lavarias
(74) *Attorney, Agent, or Firm*—Young Basile PC

(57) ABSTRACT

A surface relief hologram that includes two or more patterns, each pattern being sensitive to different radiation wavelengths. The hologram is made by defining relief features that are sensitive to different wavelengths, and in particular, to one wavelength that is visible to the unaided human eye and to one wavelength that is invisible to the unaided human eye. These relief features of different sensitivities are interspersed over the surface of the substrate in which the hologram is defined. By providing two patterns of different sensitivities, when the hologram is used in a security device, security is improved. Despite this improved security, the hologram can be mass manufactured using known techniques.

6 Claims, 2 Drawing Sheets

Z=2

Z=4

Z=8

Z=2

Z=4

Z=8

Z=2

Z=4

Z=8

SYNTHETIC COLOUR HOLOGRAM

FIELD OF THE INVENTION

The present invention relates to a hologram and a method for making such a hologram. In particular, the invention relates to a hologram for use in a security device.

BACKGROUND

Using holograms to provide some level of document security is well known. For example, many bankcards carry a holographic image of the authentic card user, so that the identity of that user can be verified. In other cases, holograms are embedded within security documents, so that they are invisible to the unaided eye. To verify or authenticate such documents, the hologram has to be irradiated with light of a suitable wavelength. Depending on the wavelength used, the holographic image can either be viewed directly or it can be sensed and imaged using suitable imaging techniques.

In the drive towards increased security, many hologram based validation or authentication techniques are becoming more complex. However, a problem with increasing the complexity of security is that it almost invariably increases the complexity of the procedures required to manufacture the security device and/or the hologram itself. This limits the use of such systems, particularly for applications where mass manufacture techniques are needed in order to make the devices commercially viable.

SUMMARY

An object of the present invention is to provide a hologram that overcomes at least some of the problems associated with known holograms.

Another object of the invention is to provide a hologram based security device that can be mass manufactured.

According to one aspect of the invention, there is provided a surface relief hologram that defines two or more patterns, each pattern being sensitive to radiation of different wavelengths one pattern being sensitive to visible radiation and the other pattern being sensitive to invisible radiation. A hologram of this nature can be made using standard processing techniques, and so is capable of mass manufacture. In addition, for security applications, by providing two or more patterns that are sensitive to different wavelengths, an additional barrier to copying is provided, so that security is enhanced.

Each pattern is defined by relief features that are formed in a suitable substrate. The relief features for each pattern are of different dimensions, so that one pattern is sensitive to light of a first wavelength and the other pattern is sensitive to light at another wavelength. Preferably, the relief features of both patterns are interspersed over the surface of the substrate. Optionally, more than two patterns may be provided, each being sensitive to radiation of different wavelengths.

Preferably the surface relief features that are sensitive to invisible radiation are sensitive to UV or IR radiation.

According to another aspect of the invention, there is provided a security device or label that includes a surface relief hologram that defines two or more patterns, each pattern being sensitive to radiation of different wavelengths, preferably wherein one pattern is sensitive to visible radiation and the other pattern is sensitive to invisible radiation.

According to yet another aspect of the invention there is provided a method for making a surface relief hologram comprising defining a plurality of surface relief features that have dimensions that are sensitive to radiation of different wavelengths. By defining features of differing sensitivities, a dual colour hologram can be made in a very simple and effective manner.

Preferably the surface relief features are defined using standard manufacturing techniques including lithography, such as photo-lithography or e-beam lithography, and etching, for example wet etching or dry etching, in particular reactive ion etching.

Preferably, the method further involves selecting two or more wavelengths of interest and using these to determine the dimensions of the surface relief features. The wavelengths of interest may be visible and/or UV and/or IR radiation. Preferably, the wavelengths of interest include one or more wavelength that is visible to the unaided eye and one or more wavelength that is invisible to the unaided eye.

BRIEF DESCRIPTION OF THE DRAWINGS

Various aspects of the invention will now be described by way of example only and with reference to the accompanying drawings, of which.

DETAILED DESCRIPTION

Figure 1A:
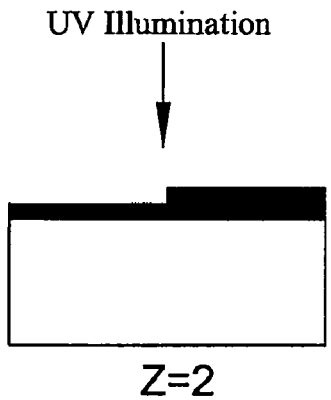
FIG. 1 is a schematic representation of a process for making a dual colour surface relief hologram.

FIG. 1 shows the steps that are taken to make a surface relief hologram in which the invention is embodied. This is based on well-known techniques that use VLSI technology. The method involves defining a series of masks and using these to form relief patterns on a suitable substrate. As is well known in this field, the number of masks required depends on the number of levels of the structure. For a sixteen level structure, four masks are needed, whereas for a structure having two hundred and fifty six levels, eight different masks are needed. The final hologram is more light efficient if the number of masks used is relatively high. However, structures having a high number of levels are difficult to fabricate. Hence, there will always be some form of compromise between ease of fabrication and light efficiency. For the sake of simplicity, in the example of FIG. 1, an eight level structure is shown, which structure is defined using three separate masks.

As a first step, the wavelengths of operation are selected, for example blue and red. Ideally, the wavelengths selected should be spectrally well separated and easily distinguishable visually. Then, the masks that are used to define the hologram are generated or devised using any suitable technique, but preferably using computer software that performs an iterative Fourier transform algorithm for design optimisation. Software of this nature is well known. In this case, however, the algorithm is adapted to do a two-stage optimisation to take into account the relative phase information for the two selected wavelengths of operation. More specifically, as part of the mask optimisation process, the depth of the surface relief features is defined, so that some of the features are sensitive to a first wavelength and some are sensitive to a second wavelength.

The depth or height of the surface relief features and the refractive index of the material in which they are formed define the wavelengths to which they are sensitive. By defining different depths of different features, some features can be made sensitive to radiation of a first wavelength and others can be made sensitive to radiation of a second wavelength. As is well known, the step size for a surface relief hologram has to be a multiple or function of the wavelength of the illuminating light. Hence, to define patterns having different sensitivities, different etch depths, or more specifically different step heights, are required. Typically, the overall surface relief depth of the features defined is around 2 to 5 microns.

Following the mask optimisation stage, data files representing the two-dimensional masks are created. These are used to form the masks using any suitable technique, such as photolithography or e-beam lithography. Once the masks are designed, they can be used to form the surface relief hologram. This can be done using either photolithography or e-beam techniques. However, for the sake of clarity, only photolithography techniques will be described.

FIG. 1 shows various stages in a process for defining a surface relief hologram. Firstly, a first one of the masks is formed, and resist is applied to a suitable substrate, for example silica or glass or metal, see FIG. 1(a). The first mask is applied over the resist and the substrate is illuminated using suitable radiation, typically UV radiation. Then, the resist is developed and the surface is etched using any suitable technique, such as wet or dry etching, in particular reactive ion etching, to remove exposed material, see FIG. 1(b). In this way, a first step is defined, and so two different levels. The first mask is then removed, as well as the remaining resist, as shown in FIG. 1(c).

Figure 1D:
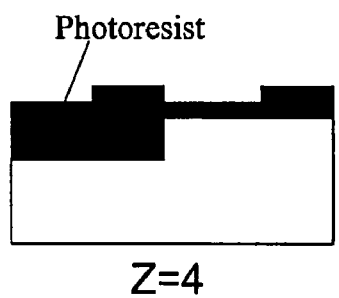
Figure 1G:
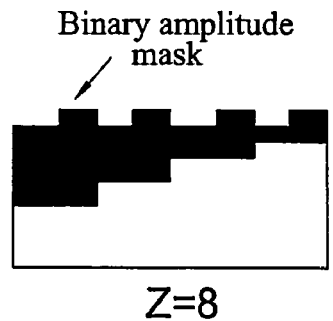
Figure 1B:
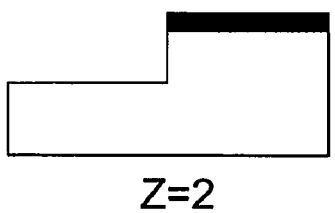
Figure 1E:
Figure 1H:
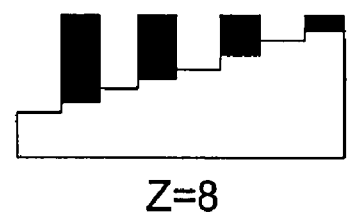
Figure 1C:
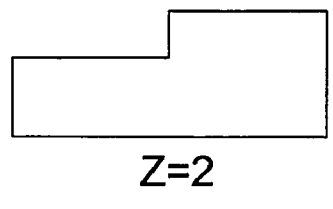
Figure 1F:
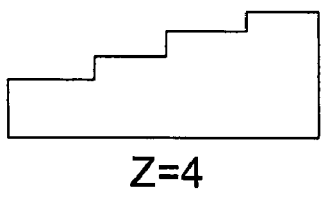
Figure 1I:
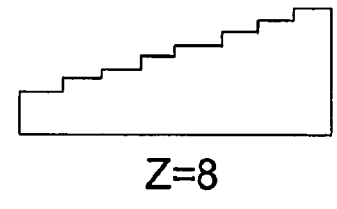

After the first mask is removed, a second layer of resist is applied. The second mask is then placed over the resist-covered substrate as shown in FIG. 1(d). As before areas of the resist that are not covered by the mask are exposed and developed, and the surface is then etched. The second mask is such that after etching, three steps are defined in the substrate, as can be seen in FIGS. 1(e) and (f), thereby defining four different levels. This process is then repeated with the third mask, so that four more levels are defined, thereby resulting in a structure having eight levels, see FIGS. 1(g) to (i).

In order to define features having different wavelength sensitivities, the etch depths for the different etch stages are varied. As noted above, the depth of the features needed to ensure sensitivity at different wavelengths is determined as part of the optimisation process. To ensure that the required step sizes are defined, in practice, the step heights are measured at each stage using a profilometer to ensure close proximity to the theoretical values calculated using the optimisation process.

Figure 2:
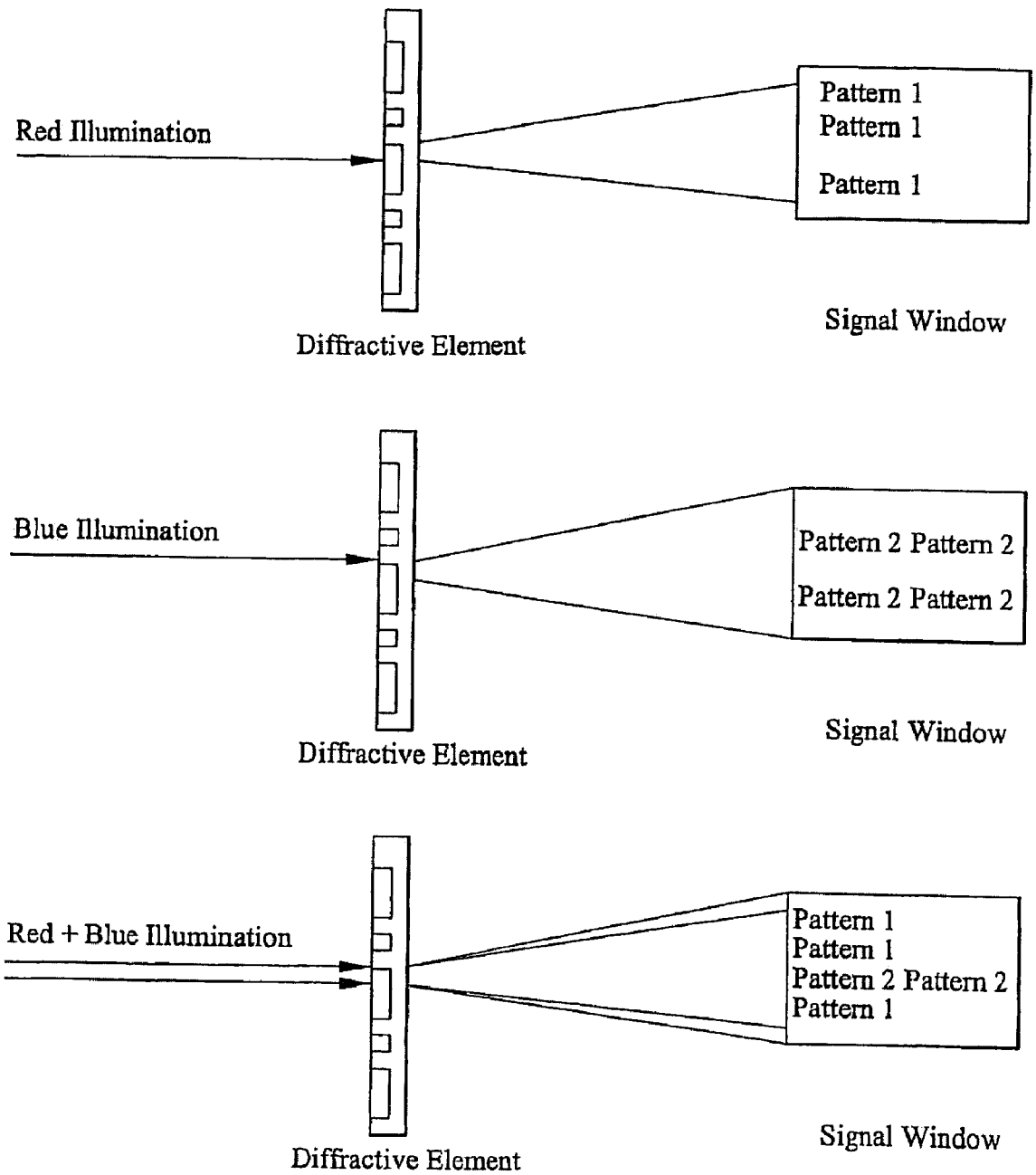
FIG. 2 is schematic representation of the use of a hologram made in accordance with the methodology of FIG. 1.

Because the hologram defined using the steps illustrated in FIG. 1 has features that are of different dimensions, when the hologram is illuminated with radiation of suitable wavelengths, different patterns can be viewed. For example, in the case where blue light and red light are chosen as the wavelengths of interest, when the hologram is illuminated with red light, only the red pattern can be seen. This is shown as Pattern 1 in FIG. 2(a). Likewise, when the hologram is illuminated with blue radiation, only the blue pattern can be seen, see Pattern 2 in FIG. 2(b). Of course, when the hologram is simultaneously illuminated with red and blue radiation, both patterns can be seen, see FIG. 2(c).

The main property of the hologram in which the invention is embodied is that it is a single diffractive surface relief element that can reconstruct distinct intensity patterns in the far field on illumination with light of different wavelengths. As will be appreciated, it could be designed to work in either a reflection or a transmission mode, depending on what is most convenient for a particular application. It is also capable of mass manufacture using a variety of replication and embossing techniques, so that many copies of the hologram can be made in a relatively simple manner. Techniques for replicating surface relief holograms are well known. In addition, assuming the wavelengths have been appropriately selected, the encoded patterns can be interrogated using very low cost and low power light emitting diodes. All of these features widen the scope for practical applications.

The surface relief hologram described above can be used in a security label or device. The hologram can be incorporated into the security device in any suitable manner. For example, the hologram may be provided in a laminated structure, such as a credit card or other security card. Of course, any coating applied to the hologram would have to be transmissive to the wavelengths that the hologram is sensitive to. Because it is relatively easy to replicate from a manufacturing perspective, but difficult to interpret the patterns without knowledge of both of the wavelengths, there is provided a high level of security in a device that can be readily mass manufactured.

A skilled person will appreciate that variations of the disclosed arrangements are possible without departing from the invention. For example, whilst the specific embodiment relates to a hologram in which both patterns are sensitive to visible light, the patterns could equally both be sensitive to light that is invisible to the unaided eye. Alternatively, one pattern may be sensitive to radiation that is visible to the unaided eye and the other may be sensitive to radiation that is invisible to the unaided eye. The invisible radiation may be UV radiation or IR radiation. Of course, in either case to detect the pattern that is sensitive to the invisible radiation, suitable detector and imaging equipment is needed so that the pattern can be detected, and ultimately viewed by an authorized party. Accordingly the above description of a specific embodiment is made by way of example only and not for the purposes of limitation. It will be clear to the skilled person that minor modifications may be made without significant changes to the operation described.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A hologram with a surface relief structure that defines at least two patterns capable of reconstruction in a far field, each pattern being sensitive for reconstruction only to radiation of a unique wavelength different from the sensitive wavelength of any other pattern in the surface relief structure, wherein one pattern is sensitive only to radiation that is visible to the unaided eye and another pattern is sensitive only to radiation that is invisible to the unaided eye, wherein the hologram is a single diffractive surface relief element that can reconstruct at least two distinct intensity patterns in the far field on illumination with the said visible and invisible radiation, and the pattern that is sensitive to visible radiation being defined by surface relief features that have a step size that is a function of a first wavelength and the pattern that is sensitive to invisible radiation is defined by surface relief features that have a step size that is a function of a second wavelength.

2. The hologram of claim 1 wherein the first and second reconstructed patterns are generated at substantially the same position.

3. The hologram as defined in claim 1 wherein the invisible radiation is selected from the group consisting of UV radiation and IR radiation.

4. A holographic security device that includes a hologram with a surface relief structure that defines at least two patterns capable of being separately and simultaneously reconstructed in a far field wherein each pattern is sensitive for reconstruction only to radiation of a unique wavelength which is different from the wavelength of the other pattern, wherein one pattern is sensitive to radiation that is visible to the unaided eye and the other pattern is sensitive for reconstruction only to radiation that is invisible to the unaided eye and wherein the two patterns are reconstructed at substantially the same position.

5. A security device as defined in claim 4 wherein the pattern that is sensitive to invisible radiation is sensitive for reconstruction to UV radiation or IR radiation.

6. A security device as defined in claim 4 wherein said one surface relief pattern has features that have a step size that is a function of a first wavelength and said another pattern has features with a step size that is a function of a second, different wavelength.

* * * * *